Jan. 17, 1928.
J. BROOKS
1,656,555
VALVE STEM LUBRICATOR
Filed March 18, 1927
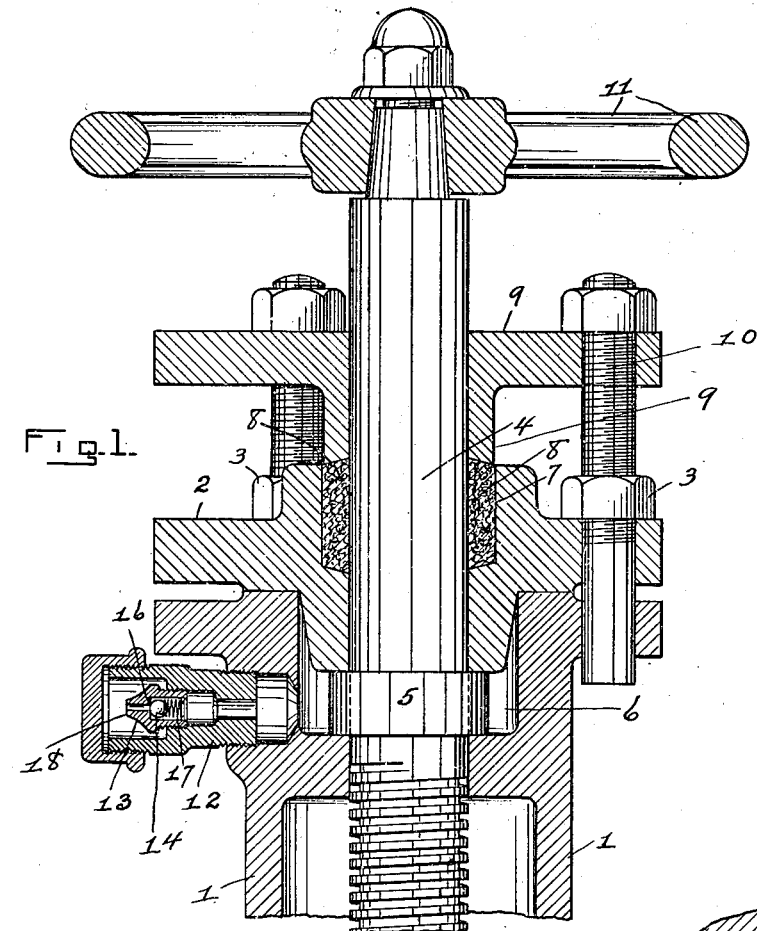
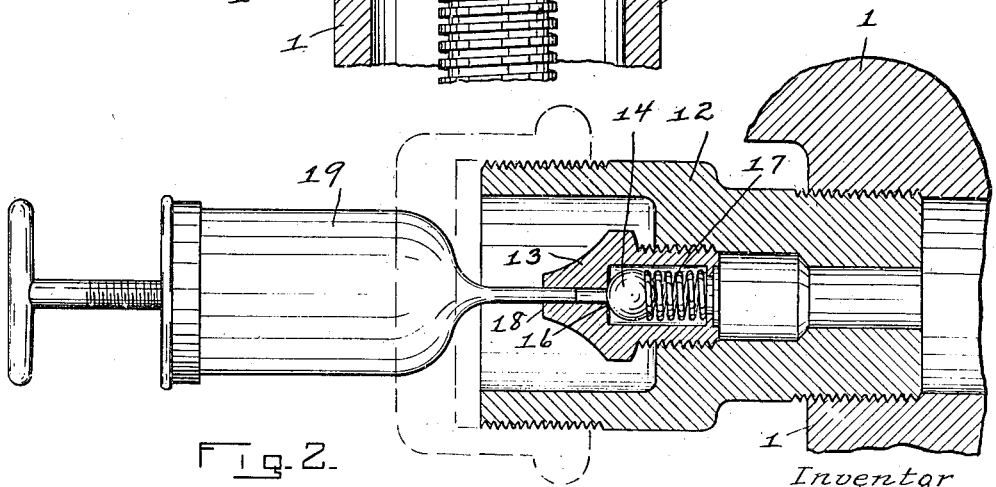
Inventor
Joseph Brooks
By
Cushman Bryant & Darby
Attorneys Patented Jan. 17, 1928.

1,656,555

UNITED STATES PATENT OFFICE.

JOSEPH BROOKS, OF TORONTO, ONTARIO, CANADA, ASSIGNOR TO THE LUDLOW VALVE MANUFACTURING COMPANY, OF TROY, NEW YORK, A CORPORATION OF NEW YORK.

VALVE-STEM LUBRICATOR.

Application filed March 18, 1927. Serial No. 176,513.

Reference may be had to the accompanying drawings, and the reference characters marked thereon, which form a part of this specification. Similar characters refer to similar parts in the several figures therein.

The principal object of the invention is to provide a convenient means for lubricating a rotary valve-stem.

Other objects will appear in connection with the following description.

Fig. 1 of the drawings is a view in central longitudinal section of a broken-away portion of a valve provided with my improved lubricating mechanism.

Fig. 2 is a similar view illustrating the manner in which the lubricator is operated by means of a grease-gun or oil-gun.

Referring to the drawings wherein the invention is shown in preferred form, 1 is a broken-away portion of a valve case, and 2, is the cap therefor secured to the case by bolts, 3.

The valve may be of any known form operated by a valve-stem which projects through the cap and the capped end of the valve case, and is mounted therein with freedom for rotation while being held from longitudinal movement by means of a peripheral flange on the stem confined within a flange-chamber formed between the cap and valve case.

I have shown a rotatory valve-stem, 4, passing through apertures in the valve case and the cap, 2, and held from longitudinal movement by means of a peripheral flange, 5, on the stem confined within a flange-chamber, 6, formed in the valve case and closed by the cap, 2.

The flange, 5, engages the inner end wall of the chamber, 6, to prevent inward longitudinal movement of the stem, and the inner end of the cap, 2, to prevent outward longitudinal movement of the stem.

The cap is formed with a stuffing box, 7, adapted to receive packing, 8, which is compressed by means of a gland or follower, 9, adjustably mounted upon the cap by means of bolts, 10.

The outer end of the valve-stem, 4, may be provided with an operating hand-wheel, 11, or other desired means for rotating the stem.

It has been found desirable in valves of the type to which this invention relates, to from time to time lubricate the flanged portion of the valve-stem and the packing in the stuffing-box to facilitate the rotation of the stem, and to prevent deterioration of the packing such as to cause leakage.

In carrying out my invention, I mount upon the valve-case, 1, a lubricator including a tubular casing, 12, screwed into an aperture in the valve case in communication with the flange-chamber, 6, and an apertured screw-cap, 13, for the outer end of said casing, 12.

The interior of the screw-cap, 13, forms a valve-chamber for a ball valve, 14, which engages a valve seat, 16, on the interior of the cap to close the aperture, 15, therethrough.

The ball valve is yieldingly held against the seat, 16, by means of a coil spring, 17, forming a check valve which opens inwardly under external pressure, and automatically closes under the influence of the spring, 17, when the pressure is discontinued.

The outer end of the cap, 13, is in the form of a nipple, 18, adapted to receive the nozzle of a grease-gun or oil-gun, 19, whereby lubricant can be forced through the casing, 12, into the flange chamber, 6, in the valve case, 1.

The ball valve, 14, yields inwardly under the pressure of the lubricant being injected by the grease gun, and is restored to its seat by the spring, 17, when the injecting pressure is discontinued.

I am thus able, when it is desirable, to fill the flange chamber, 6, with lubricant under pressure, which lubricant tends to follow along the valve-stem, 4, from the flange chamber into the stuffing box, 7, to lubricate the packing, 8, therein.

The valve stem can thus be maintained in a freely rotatable condition, and leakage due to hardening and shrinkage of the packing in the stuffing box prevented.

The lubricator may have a removable dust-cap on its outer end if desired.

What I claim as new and desire to secure by Letters Patent is:

In combination, a valve casing having a chamber in one end and apertured to receive a valve stem, a cap mounted on said casing and having an apertured skirt projecting into said chamber, a stuffing box formed in said cap, a packing in said stuffing box, a gland for said packing, a rotary valve stem projecting through said stuffing box and apertures, and having a peripheral flange positioned in said chamber and confined between the casing and said skirt, a forced feed lubricator communicating with said chamber below said packing, said chamber being enlarged whereby the lubricant upo being forced therein will seep up to th packing to lubricate the same.

In testimony whereof, I have hereunto se my hand this 8th day of February 1927.

JOSEPH BROOKS.